United States Patent
Holden et al.

(10) Patent No.: US 7,233,980 B1
(45) Date of Patent: Jun. 19, 2007

(54) SYSTEM AND METHOD FOR DYNAMIC QUEUING IN AN AUTOMATIC CALL DISTRIBUTOR

(75) Inventors: Mark J. Holden, Allen, TX (US);
Scott L. Orton, Allen, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 583 days.

(21) Appl. No.: 09/735,427

(22) Filed: Dec. 12, 2000

Related U.S. Application Data

(60) Provisional application No. 60/174,119, filed on Dec. 31, 1999.

(51) Int. Cl.
*G06F 15/16* (2006.01)
*H04M 3/00* (2006.01)
*H04M 5/00* (2006.01)

(52) U.S. Cl. .............. 709/219; 709/227; 379/265.01; 379/265.02; 379/265.08; 379/265.09; 379/265.14; 379/266.01; 379/266.03; 379/266.06

(58) Field of Classification Search ............... 709/217, 709/218, 219, 227, 229
See application file for complete search history.

(56) References Cited

U.S. PATENT DOCUMENTS

| | | | | |
|---|---|---|---|---|
| 4,788,715 A | * | 11/1988 | Lee | 379/84 |
| 5,646,988 A | * | 7/1997 | Hikawa | 379/266.01 |
| 5,905,793 A | * | 5/1999 | Flockhart et al. | 379/266.06 |
| 5,999,965 A | * | 12/1999 | Kelly | 709/202 |
| 6,049,603 A | * | 4/2000 | Schwartz et al. | 379/309 |
| 6,226,287 B1 | * | 5/2001 | Brady | 370/352 |
| 6,327,364 B1 | * | 12/2001 | Shaffer et al. | 379/265.02 |
| 6,335,744 B1 | * | 1/2002 | Korilis et al. | 345/835 |
| 6,389,028 B1 | * | 5/2002 | Bondarenko et al. | 709/204 |
| 2003/0061354 A1 | * | 3/2003 | Burg et al. | 709/227 |

OTHER PUBLICATIONS

Fredrik Fingal and Patrik Gustavsson, *A SIP of IP-telephony* Master's Thesis, Feb. 10, 1999.

* cited by examiner

*Primary Examiner*—Patrice Winder
*Assistant Examiner*—Hassan Phillips
(74) *Attorney, Agent, or Firm*—Haynes and Boone, LLP

(57) ABSTRACT

A method and system for dynamic queuing utilizes a SIP messaging structure within a call center's architecture for interacting with a caller. The method and system can be used for ACD services developed for IP telephony using SIP as the signaling protocol. A SIP subscriber can also interact with an ACD system in the Public Switched Telephone Network (PSTN) work space. In the latter case, a PSTN-to-IP gateway carries the bearer path and call level signaling between the two spaces, and corresponding Computer Telephony Integration (CTI) signaling links are used for linking the ACD specific signaling between the two spaces.

23 Claims, 3 Drawing Sheets

*Fig. 1*
*(PRIOR ART)*

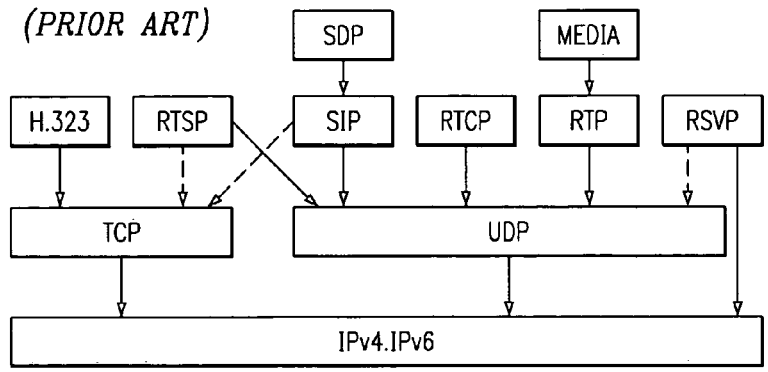

*Fig. 2*
*(PRIOR ART)*

| GENERAL-HEADERS | ENTITY-HEADERS | REQUEST-HEADERS | RESPONSE-HEADERS |
|---|---|---|---|
| CALL-ID | CONTENT-ENCODING | ACCEPT | ALLOW |
| CONTACT | CONTENT-LENGTH | ACCEPT-ENCODING | PROXY-AUTHENTICATE |
| CSEQ | CONTENT-TYPE | ACCEPT-LANGUAGE | RETRY-AFTER |
| DATE | | AUTHORIZATION | SERVER |
| ENCRYPTION | | CONTACT | UNSUPPORTED |
| EXPIRES | | HIDE | WARNING |
| FROM | | MAX-FORWARDS | WWW-AUTHENTICATE |
| RECORD-ROUTE | | ORGANIZATION | |
| TIMESTAMP | | PRIORITY | |
| TO | | PROXY-AUTHORIZATION | |
| VIA | | PROXY-REQUIRE | |
| | | ROUTE | |
| | | REQUIRE | |
| | | RESPONSE-KEY | |
| | | SUBJECT | |
| | | USER-AGENT | |

Fig. 3
(PRIOR ART)

| CALL-ID | UNIQUELY IDENTIFIES A PARTICULAR INVITATION OR ALL REGISTRATIONS OF A CLIENT |
|---|---|
| CONTACT | CONTAINS LOCATION(S), THAT ARE USED IN DIFFERENT PURPOSES DEPENDING ON THE MESSAGE |
| CONTENT-LENGTH | INDICATES THE MESSAGE BODY LENGTH IN BYTES |
| CONTENT-TYPE | INDICATES THE MEDIA TYPE OF THE MESSAGE BODY |
| CSEQ | (COMMAND SEQUENCE) UNIQUELY IDENTIFIES A REQUEST WITHIN A CALL-ID |
| FROM | INDICATES THE INITIATOR OF THE REQUEST |
| REQUIRE | USED BY CLIENTS TO TELL THE USER AGENT SERVER ABOUT OPTIONS THAT THE CLIENT EXPECTS THE SERVER TO SUPPORT IN ORDER TO PROPERLY PROCESS THE REQUEST |
| SUBJECT | INDICATES THE NATURE OF THE CALL |
| TO | SPECIFIES THE RECIPIENT OF THE REQUEST |
| VIA | INDICATES THE PATH TAKEN BY THE REQUEST SO FAR |

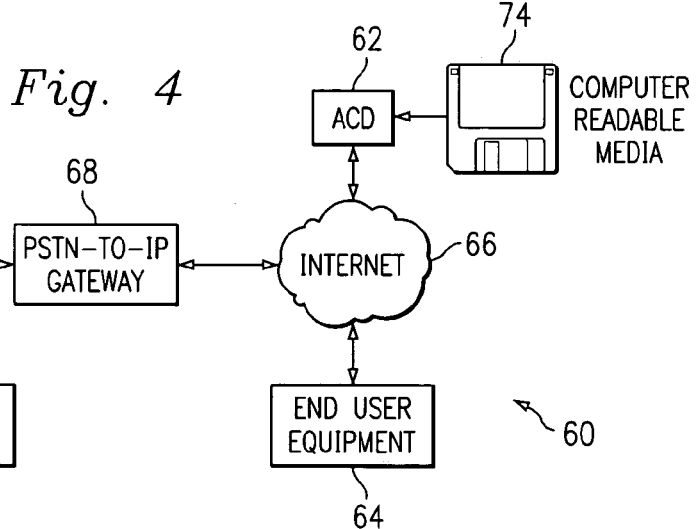

Fig. 4

SYSTEM AND METHOD FOR DYNAMIC QUEUING IN AN AUTOMATIC CALL DISTRIBUTOR

FIELD OF THE INVENTION

The invention relates, generally, to data processing systems and telecommunication systems, and, more specifically, to a technique for dynamic queuing in an automatic call distributor.

BACKGROUND OF THE INVENTION

Two fundamentally different switching technologies exist that enable digital communications. The first type, circuit-switched networks, operate by establishing a dedicated connection or circuit between two points, similar to public switched telephone networks (PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity. The second type packet-switched networks, typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets; intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

It is desirable for communications originating from a PSTN network to terminate at equipment in an IP-based network. Problems arise, however, when a user on a circuit-switched network tries to establish a communication link to a packet-switched data network, and vice versa, due to the disparity in addressing techniques among other differences used by the two types of networks. Accordingly, many of the services currently available on one network are typically not available to communications originating on the other network.

Automatic call distribution (ACD) centers are one such service which has been used successfully on traditional circuit-switched networks. Typically, a number of human operators or "agents" are used to operate telephones or other terminating apparatus to answer incoming calls for a business entity. Such automatic call centers typically are used by companies which service large numbers of incoming calls for sales, support and customer ordering, etc. Generally, a traditional call center consists of routing and switching hardware and a plurality of terminating equipment located on the same Private Branch Exchange (PBX).

In some existing ACD applications, an added service is offered in the PSTN space whereby after a call of the ACD system has been established, the end user is coupled to the ACD system via a time division multiplexing (TDM) 64 kbps circuit. Often when a call comes into an ACD center, the traffic load is such that the user can be placed into a holding pattern for lengthy times. Some systems do provide periodic messages like "your call is important to us, please stay on the line". Messages of this variety attempt to keep a user engaged. Some systems also give periodic estimates as to how much longer the user has to wait. Drawbacks to such a system are that the end user is not in control. The end users have to wait until the call is eventually answered or until the next periodic estimate is given so that the end users have an idea of where they are in the queue.

U.S. Pat. No. 5,020,095 to Morganstein et al. describes a call processing apparatus which queues calls that are waiting to be connected to a service position. The apparatus calculates a queue position and wait time and transmits the queue data to the calling party. U.S. Pat. No. 5,444,774 to Friedes describes an interactive queuing system for a call center and collects initial information from the caller while the call is in the holding queue. The information input by the caller enables the apparatus to query a database and to retrieve additional information needed to service the call. That information is then displayed to a next available agent as the call is received by that agent.

U.S. Pat. No. 5,561,707 to Katz describes a telephone interface system adapted to select or qualify a set of callers, acquire data from the callers in the set and statistically analyze the acquired data. U.S. Pat. No. 4,788,715 to Lee describes an automatic call distributor system wherein calls waiting in a queue are informed of expected wait time until connection to an agent. The announcements are periodically updated to reassure customers that they are progressing in the queue. The customers are also given the opportunity to leave a message if they do not wish to wait in the queue.

However, as more and more companies offer telephone access to their customer service, sales and support staffs, problems associated with waiting on hold have grown. Such problems include, for example, excessively long waits, full queues that can not accept additional callers, and accidental disconnects. These problems have engendered a high level of frustration and ill will amongst callers. Some companies now routinely inform calling customers on hold how long a current wait is expected to last before a service representative will be available to take the call.

SUMMARY OF THE INVENTION

Although some combinations of IP telephony and Session Initiation Protocol (SIP) exist, never before has a system and method been created that utilizes a SIP messaging structure within a call center's architecture that interacts with a caller like the present invention does. The method and system of the present disclosure can be used for ACD services developed for IP telephony using SIP as the signaling protocol. A SIP subscriber can also interact with an ACD system in the Public Switched Telephone Network (PSTN) work space. In such an instance, a PSTN-to-IP gateway carries a bearer path and call level signaling between the two spaces, and corresponding Computer Telephony Integration (CTI) signaling links are used for linking the ACD specific signaling between the two spaces.

An advantage of the present embodiments is that they provide a mechanism to greatly facilitate the usage of ACD systems for an end user, decreasing a frustration level involved with long queue delays and increasing an overall customer satisfaction. As such, the embodiments of the present disclosure provide a universal appeal across all call center uses. As the present embodiments involve direct interaction and feedback to an end-user, other advantages are easily identified and immediately obvious.

The present embodiments solve frustrations experienced by system end users who are placed in ACD queues during high traffic times. In addition, the present embodiments allow the end users to gain more control of their time by evaluating their immediate time constraints in order to make appropriate decisions as to whether it is in their best interest to remain engaged with the ACD system. Additionally, the present embodiments enable ACD vendors an ability to provide a higher quality of periodic queue notifications to end users, as well as add to their business advertising effectiveness, by allowing end users to navigate media rich and interactive promotional advertising while they are held in the queue.

As SIP starts penetrating the industry, the present embodiments become an important player in the SIP based services which were not possible before the introduction of SIP and IP telephony.

BRIEF DESCRIPTION OF THE DRAWINGS

FIG. 1 illustrates the Internet telephony protocol architecture;
FIG. 2 illustrates exemplary SIP headers;
FIG. 3 illustrates exemplary fundamental headers;
FIG. 4 illustrates a communications network for implementing the method of dynamically queuing in an automatic call distributor according to one embodiment of the present disclosure.

DETAILED DESCRIPTION

Figure 5:
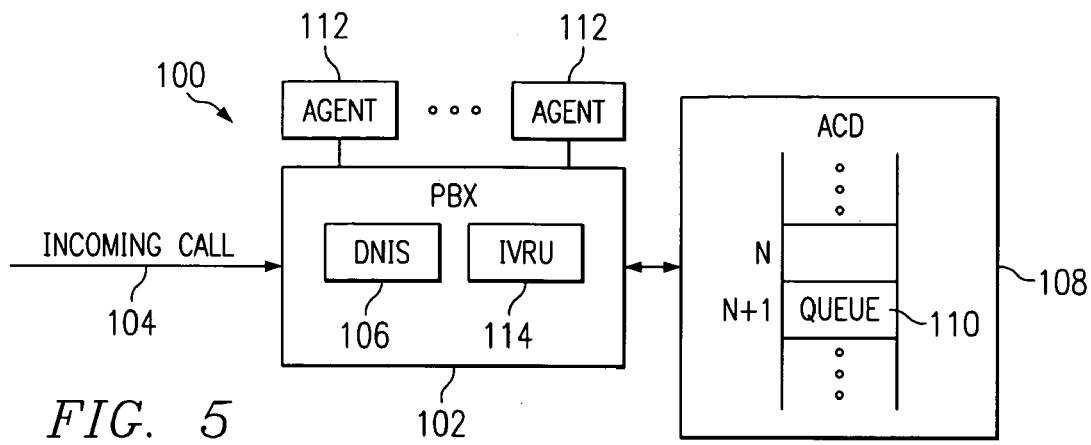
FIG. 5 shows a block diagram view of an automatic call distributor utilizing dynamic queuing according to another embodiment of the present disclosure.

The present invention can be described with several examples given below. It is understood, however, that the examples below are not necessarily limitations to the present invention, but are used to describe typical embodiments of operation.

First, a detailed description of the Session Initiation Protocol will help describe the particular details of the invention. SIP is designed as a part of the overall IETF multimedia data and control architecture. SIP is very modular. It handles basic call signaling, user location and basic registration. Call control signaling can also be added using an extension. Billing, Quality of Service (QoS), session content description and other functionality are orthogonal and are handled by other protocols. This means that a protocol can be modified without affecting the other protocols using it. The whole Internet telephony protocol stack is shown in FIG. 1. The architecture currently incorporates many protocols. TCP, UDP, IP and the protocols beneath serve the protocols above them with a possibility to send/receive data to/from other locations across a network. The protocols are only mentioned here and then further described later in the text.

Internet Protocol (IP) is a network layer protocol that provides an unreliable, connectionless data delivery service on a "best effort basis";

Transmission Control Protocol (TCP), is a connection-oriented transmission protocol on an IP-based network;

User Datagram Protocol (UDP), is a connectionless transmission protocol on an IP-based network;

H.323 is the International Telecommunication Union's (ITU) protocol for multimedia communication;

The Real Time Streaming Protocol (RTSP), is for controlling delivery of streaming media;

The Session Initiation Protocol (SIP), is an application-layer control (signaling) protocol for creating, modifying and terminating sessions with one or more participants;

The RTP Control Protocol (RTCP), provides support for real-time conferencing of groups of any size within an internet;

The Real-time Transport Protocol (RTP), is the Internet-standard protocol for the transport of real-time data, including audio and video;

The Resource reSerVation Protocol (RSVP), is used for reserving network resources and is a way keeping a certain QoS of the transmission; and The Session Description Protocol (SDP), is used for describing multimedia sessions.

The protocols are independent parts and stand alone, but can use and can be used by other protocols. The SIP protocol for example uses the SDP to specify which media to be used in a conference that is being set up. SIP then uses RTP and RTCP to transport the media and to control the media connection.

The Internet Protocol (IP), is part of the TCP/IP protocol suite, and is the most widely used internetworking protocol. IP is a connectionless protocol, which means that there is no established connection between the end points that are communicating. Each packet that travels through the Internet is treated as an independent unit of data without any relation to any other unit of data. It is for the protocol above (i.e., a higher level protocol) to keep track of the order between packets and for guaranteeing that a given packet arrived, if so wanted. The protocol uses IP-addresses, which includes a 32-bit or a 128-bit for the new version IPv6 global internet address. The address is coded to allow a variable allocation of bits to specify the network and host. This encoding provides flexibility in assigning addresses to hosts and allows a mix of network sizes on an internet. There are several protocols beneath the IP (i.e., at a lower level protocol) to handle the network and the physical connection, however they are not mentioned here for brevity.

The Transmission Control Protocol (TCP), comprises a connection-oriented protocol, which means that a connection is established and maintained until such time as a message or messages to be exchanged by the application programs at each end have been exchanged. TCP is responsible for ensuring that a message is divided into the packets that IP manages and for reassembling the packets back into the complete message at the other end. In the OSI communication model, TCP is in layer 4, the Transport Layer.

The User Datagram Protocol (UDP), is known as a connectionless protocol and uses the Internet Protocol to send a data unit (called a datagram) from one computer to another. Unlike TCP, however, UDP does not provide the service of dividing a message into packets (datagrams) and reassembling the message at the other end. Specifically, UDP doesn't provide sequencing of the packets that the data arrives in. This means that the application program that uses UDP must be able to make sure that the entire message has arrived and that the message is in the right order. Network applications that want to save processing time because they have very small data units to exchange (and therefore very little message reassembling to do) may prefer UDP to TCP.

The Real-time Transport Protocol (RTP), is a transport protocol for real-time data, including audio and video. The RTP protocol can be used for, among others, interactive services such as Internet telephony. RTP consists of a data portion and a control portion. The latter is called RTCP. The data part of RTP is a protocol providing support for applications with real-time properties such as continuous media (e.g., audio and video), including timing reconstruction, loss detection, security and content identification. RTCP provides support for real-time conferencing of groups of any size within an Internet. This support includes source identification and support for gateways like audio and video bridges as well as multicast-to-unicast translators. RTCP offers quality-of-service feedback from receivers to the multicast group as well as support for the synchronization of different media streams.

Resource reSerVation Protocol (RSVP) allows channels or paths on the Internet to be reserved for a multicast (one source to many receivers) transmission of video and other high-bandwidth messages. RSVP is part of the Internet Integrated Service (IIS) model, which ensures best-effort service, real-time service, and controlled link-sharing.

The basic routing philosophy on the Internet is "best-effort," which serves most uses well enough but isn't adequate for the continuous stream transmission required for video and audio programs over the Internet. With RSVP, end users who desire to receive a particular Internet service can reserve bandwidth through the Internet in advance of the particular Internet service or program and be able to receive it at a higher data rate and in a more dependable data flow than usual. When the particular program starts, it will be multicast to those specific users who have reserved routing priority in advance. RSVP also supports unicast (one source to one destination) and multi-source to one destination transmissions.

The Real Time Streaming Protocol (RTSP) is an application-level protocol to control the delivery of data with real-time properties. RTSP provides an extensible framework to enable controlled, on-demand delivery of real-time data, such as audio and video. Sources of data can include both live data feeds and stored clips. The RTSP protocol is intended to control multiple data delivery sessions, provide a means for choosing delivery channels such as UDP, multicast UDP and TCP, and provide a means for choosing delivery mechanisms based upon RTP.

The Session Initiation Protocol is a signaling protocol, for creating, modifying and terminating prescribed sessions. These prescribed sessions can include multimedia conferences, Internet telephone calls and similar applications consisting of one or more media types as audio, video, whiteboard etc. SIP invitations, used to create sessions, carry session descriptions, which allow participants to agree on a set of compatible media types. Participants can include a human user, a "robot" (e.g. media server), or a gateway to another network. The participants can communicate via multicast or via a mesh of unicast relations, or a combination of these.

SIP is currently under development within the Internet Engineering Task Force (IETF) Multiparty Multimedia Session Control (MMUSIC) working group. SIP is based upon some other protocols coming out of the IETF, in particular the Simple Mail Transfer Protocol (SMTP) and Hyper Text Transfer Protocol (HTTP). Like these, SIP is a textual protocol based on the client-server model, with requests generated by one entity (the client), and sent to a receiving entity (the server) which responds them. A request invokes a method on the server and can be sent either over TCP or UDP. The most important SIP method, of the currently six, is the INVITE method, used to initiate a call between a client and a server.

There are two components in a SIP system, user agents and network servers. A user agent is an end system that acts on behalf of a user. Usually it consists of two parts, a client and a server, as the user probably is wishing to both be able to call and to be called. The client part, User Agent Client (UAC), initiates SIP requests. The server part, User Agent Server (UAS), receives requests and returns responses on behalf of the user.

There are two kinds of network servers, proxy servers and redirect servers. A SIP proxy server forwards requests to a next server after deciding which server it should be. The next server could be any kind of SIP server, the proxy does not know and does not have to know. Before a request has reached the UAS, the request may have traversed several servers. The particular servers will be traversed in reverse order by the response. As a proxy server issues both requests and responses, the proxy server contains both a client and a server.

Another network server type, referred to as a redirect server, does not forward requests to the next server. Instead the redirect server sends a redirect response back to the client containing the address of a next server to contact. To be able to locate and invite participants, there has to be a way that the called party could be addressed. The entities addressed by SIP are users at hosts, identified by a SIP URL. The SIP URL has an email-like identifier of the form user@host. Where the user part can be a user name, a telephone number or a civil name. The host part is either a domain name or a numeric network address. In many cases a user's SIP URL could be guessed from the users email address. Examples of SIP URLs might include:

sip:patrik@example.com
sip:beagleboy@176.7.6.1

A SIP URL may well be placed in a web page, whereby clicking on a given link, as in the case of mail URLs, initiates a call to the corresponding address.

When using an email address, SIP has to resolve the name@domain to user@host. This could lead to different addresses depending on time of the day, media to be used and so on.

When a client wishes to send a request, the client first obtains the address of the participant to be contacted. If the address consists of a numeric IP address, the client contacts the SIP server there. Otherwise, if the address is of the form name@domain, the client has to translate the domain part to an IP address where a server may be found. The translation is done with a DNS lookup. Once the IP address is found, the request is sent using either UDP or TCP.

When the SIP server receives a request, the SIP server has to locate the user in the server's domain. The user's location could be of a different kind. The user could, for example, be logged in at zero to many hosts or at a different domain. To find the user's actual location, there is an outside SIP entity, a location server. Being asked for a user's location, the location server returns a list of (zero to many) locations where the user could be found.

A given location can dynamically be registered with the SIP server. The user may also install call handling features at the server. This is done by sending a REGISTER request, explained later herein.

If the location of the user was not found, the server sends a response to the client indicating this. Otherwise, the action taken by the server varies with the type of the SIP server wherein a SIP proxy server can send a request in sequence or in parallel to the locations listed. A SIP redirect server can return a response with the list placed in Contact headers whereby the client can then send directly to the users location(s).

In addition to the above discussion, there are two kinds of SIP messages, requests and responses. Clients issue requests and servers answer with responses. These, requests and responses, include different headers to describe the details of the particular communication.

Unlike other signaling protocols such as H.323, SIP is a text-based protocol. This makes a SIP header largely self-describing and minimizes the cost of entry. Since most values are textual, the space penalty is limited to the parameter names.

If not designed carefully, text-based protocols can be difficult to parse due to their irregular structure. SIP attempts to avoid this difficulty of parsing by maintaining a common structure of all messages and the message header fields, allowing a generic parser to be written. Request and response use a generic-message format which consists of a start-line, one or more header-fields ("headers"), an empty line indicating the end of the header fields, and an optional message-body. SIP was also designed for character-set independence, so that any field can contain any ISO 10646 character. Together with the ability to indicate languages of enclosed content and language preferences of the requester, SIP is well suited for international use.

To make SIP signaling more secure, encryption and authorization can be used. Encryption can be used, for example, to prevent packet sniffers and other eavesdroppers from having an ability of determining who is calling whom. Authorization is used to prevent an active attacker from modifying and replaying SIP requests and responses.

Messages use header-fields to specify such things as caller, callee, the path of the message, type and length of message body and so on. Some of the header fields are used in all messages, the rest is used when appropriate. While a SIP application does not need to understand all of the mentioned headers, it would be desirable. The entity receiving simply silently ignores headers that it does not understand. The order in which the headers appear is generally of no importance, except for a Via field and hop-by-hop headers that appear before end-to-end headers.

FIG. 2 illustrates thirty seven (37) headers. The headers can be divided into four different groups of headers, including general header fields, entity header fields, request header fields, and response header fields. In particular, general header fields apply to both request and response messages. Entity header fields define information about the message body or, if no body is present, about the resources identified by the request. Request header fields act as request modifiers and allow the client to pass additional information about the request, and about the client itself, to the server. Response header fields allow the server to pass additional information about the response which cannot be placed in the Start-Line (in responses called Status-Line).

The above-mentioned header fields give information about the server and about further access to the resource identified by the Request-URI. FIG. 3 illustrates some of the most fundamental headers.

A request is characterized by the Start-Line, called Request-Line. The Request-Line starts with a method token followed by a Request-URI and the protocol version. There are six different kinds of requests in the current version of SIP (version 2.0). The requests are referred to as methods and include the following, listed with their functionality.

INVITE: The INVITE method indicates that a user or service is being invited to participate in a session. For a two-party call, the caller indicates the type of media it is able to receive as well as their parameters such as network destination. A success response indicates in its message body which media the callee wishes to receive.

ACK: The ACK request confirms that the client has received a final response to an INVITE. It may contain a message body with the final session description to be used by the callee. If the message body is empty, the callee uses the session description in the INVITE request. The ACK method is only used with the INVITE request.

BYE: The user agent client uses BYE to indicate to the server that the user wishes to release the call.

CANCEL: The CANCEL request cancels a pending request, but does not affect a completed request. (A request is considered completed if the server has returned a final response).

OPTIONS: The OPTIONS method solicits information about capabilities, but does not set up a connection.

REGISTER: Conveys information about a user's location to a SIP server. After the headers following the Request-Line, the request may contain a message body that is separated from the headers with an empty line. The message body is always a session description and, if present, the type of Internet media in it is indicated by the Content-Type header field.

FIG. 4 illustrates a communications network 60 for implementing the method of dynamic queuing in an automatic call distributor according to one embodiment of the present disclosure. Network 60 includes an ACD 62 coupled for communication with end user equipment 64 via the Internet 66, a PSTN-to-IP gateway 68, and the PSTN 70. In addition, an ACD 72 is coupled to network 60 via PSTN 70. In one embodiment, ACD 62 includes a SIP server. In addition, computer readable media or apparatus 74 is functionally coupled with the SIP server of ACD 62 having instructions for carrying out the various functions of the method of the present embodiments described herein.

At this point in the description, additional details of an ACD will be described. To implement an automatic call answering/queuing system, a range of products are utilized, available from various manufacturers. Referring now to FIG. 5, an automatic answering system 100 includes a private branch exchange (PBX) 102 which processes an incoming call 104 and identifies the number dialed via a dialed number identification service function (DNIS) 106. Once that information is stored, the PBX 102 checks a routing database for DNIS routing instructions and routes the call to an automatic call distributor (ACD) 108. The ACD 108 logs each call in memory queue 110 and assigns each call a rank, based on the order in which the call arrived.

If there are currently N calls in the queue 110, the ACD 108 assigns a next call received from the PBX 102 to position N+1 in the queue 110.

When the PBX 102 indicates to the ACD 108 that an agent 112 is available to answer a call, the call resident at the top of the queue 110 in the ACD 108 is removed and sent to the PBX 102, which takes the corresponding incoming line off hold and routes the call to the available agent 112. The ACD then advances or moves up each call in the queue and the process continues.

If the system 100 is provided with an automatic voice response capability, it includes an interactive voice response unit (IVRU) 114. The IVRU 114 is utilized to intermittently communicate with incoming callers, indicating position in the queue and waiting time until the call is expected to be answered.

In connection with the automatic call answering system 100, the embodiments of the present disclosure use SIP to provide value added services in the area of ACD applications. That is, according to one embodiment, an ACD system utilizes SIP's message structure to allow an end user to dynamically query, at the time of the end user's choosing, the ACD system to determine where the end user is currently positioned in the queue. The ACD system returns the dynamic query response information to the SIP user through a return message, for example, for being displayed (if in display format) and/or played out as a verbal message (if in audio format) for the end user. Accordingly, the user obtains almost immediate feedback for use to determine if it is in the user's best interest to remain engaged with ACD system.

Although it would be possible to apply a dual tone multifrequency (DTMF) tone receiver in every queue position in an ACD in the traditional PSTN type system to accomplish similar results, such a solution would be very expensive. Indeed, such a solution would be incredibly expensive because all of the DTMF tone receivers have to be dedicated to each user and the dedicated circuits between the end user and the tone receiver. In contrast, the embodiments of the present disclosure involve high level messaging for accomplishing a similar function. Accordingly, the present embodiments eliminate the need for dedicated and expensive hardware resources to provide the same function in the PSTN space. In addition, no dedicated circuits are involved, since the IP telephony solution is not circuit based.

Figure 6:
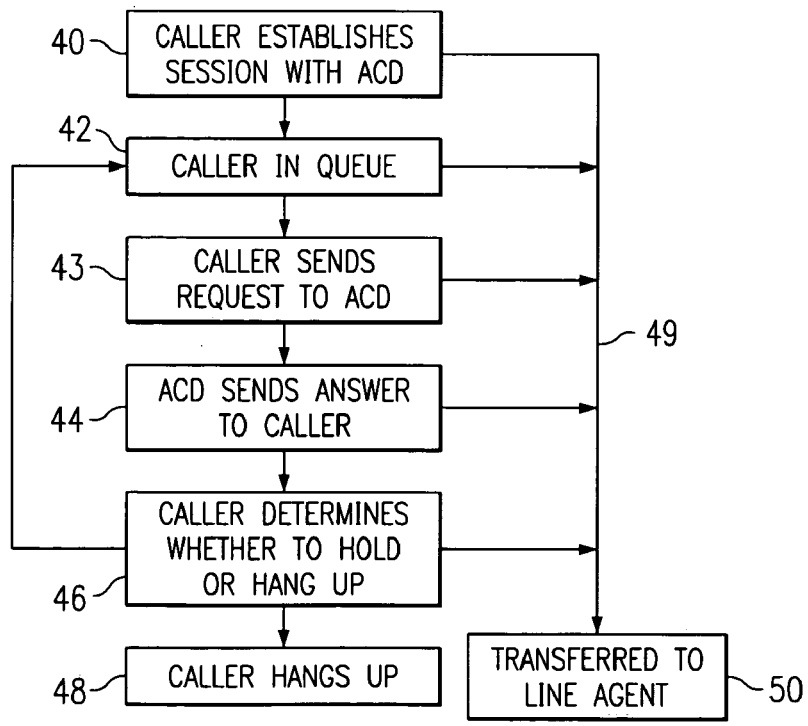
FIG. 6 is a flow chart of an example implementation according to one embodiment of the present disclosure.

FIG. 6 illustrates an exemplary flow diagram view of a method including the use of the SIP message structure to send a request to an ACD according to an embodiment of the present disclosure. First, an end-user caller establishes a call 40, and is thereafter put in the ACD queue in step 42. The caller then sends a request to the ACD in step 43. After the ACD determines an answer to the request, the ACD sends a reply to the caller in step 44. The caller then determines whether to hold or hang up in step 46. If the caller decides to hold, the caller then is kept (or put back) in the queue at step 42. However, if the caller hangs up at step 48, the process ends. Alternatively, the process ends and the ACD keeps or stores certain prescribed information about the caller, if desired. Some examples of the prescribed information may include how long the caller was kept on hold, and how many times the caller attempted to reach a live agent. In addition, at almost any stage of the flow diagram, the caller can get transferred to a live agent 50 by the ACD system, as indicated by reference numeral 49 in the flow diagram of FIG. 6.

The present embodiments can also be extended to involve SIP clients interacting with PSTN based ACD systems. In such an instance, the users' bearer channel voice path passes through an IP/PSTN gateway as normal. The ACD signaling, as described above, however, is translated into a CTI based message exchange between the IP space and the ACD system using suitable techniques known in the art. In addition, the PSTN ACD system is appropriately modified to support this type of messaging.

Another embodiment of the method of the present disclosure allows the ACD system to provide a more efficient, messaging-based, periodic notification mechanism, with much richer information content than a present day standard voice-based system. For instance, in one embodiment, message-based notifications are made more frequent. While some existing systems often play promotional content to end users as they are in the queue, the method of the present disclosure allows a rich multi-media based display of multi-media with the capability of making the promotion interactive. For example, with the multi-media display, the user can navigate through promotional material ("scan the catalogue") or play a desired multimedia game, while being placed in the queue.

According to another embodiment of the present disclosure, a computer program product is provided for enabling dynamic queuing in an automatic call distributor (ACD) server. The computer program product includes a computer program processable by a computer system for causing the computer system to perform the following. Responsive to receiving a call placed from a user to the ACD server, the program places the user call in a queue. Responsive to a user request subsequent to placing the call, the program dynamically determines at least one of the following queue information selected from the group consisting of a user's queue position, holding times, and other related queue data. The computer program causes the computer system to transmit the queue information from the ACD server to the user. Lastly, the computer program product includes apparatus, such as any suitable computer-readable media or storage device, from which the computer program is accessible by the computer system. Programming of the computer program can be accomplished using programming techniques known in the art, and thus not described in further detail herein.

In addition, according to the various embodiments with respect to the computer program product, the function of dynamically determining queue information includes receiving a request via Session Initiation Protocol (SIP). The computer program further causes the computer system to function, subsequent to a disconnection of at least one call from the user in response to a user directive, by calling back the user when the ACD server has determined a given priority based on a number of times that the user has called and an accumulated wait time. The computer program further causes the computer system to push down content from the ACD server to the user, the content including at least one of the following selected from the group consisting of a web page, media rich promotional advertising, and interactive promotional advertising.

Still further, the computer program causes the computer system to track how much time the user has been on hold and credits the user an appropriate amount of time the next time the user calls back, responsive to the user terminating the call before the. ACD server transfers the call to a live agent. The computer program still further causes the computer system to track how much time the user has been on hold and prioritizes the user within the queue the next time the user calls back, responsive to the user terminating the call before the ACD server transfers the call to a live agent.

In one embodiment, a SIP based client is utilized for establishing the call with the ACD server and the ACD server being within a PSTN. In this instance, the computer program causes the computer system to translate SIP messages for the ACD server via a PSTN/IP gateway. In another embodiment, the ACD server is a SIP based client, and the user is within a PSTN. The computer program further causes the computer system to translate SIP messages for the user via a PSTN/IP gateway. Still further, the computer program causes the computer system to push games from the ACD server to the user.

In yet another embodiment, a computer program product for enabling dynamic interacting with an automatic call distributor (ACD) includes a computer program processable by a computer system for causing the computer system to: a) receive a call placed from a user to an ACD server, the user call being placed in a queue while awaiting to be connected with a line agent, b) dynamically receive at the ACD server a request from the user for determining at least one of the following queue information selected from the group consisting of a user's queue position, holding times, and other related queue data, wherein the request utilizes Session Initiation Protocol (SIP), and c) transmit the queue information from the ACD server to the user.

Accordingly, the present invention provides a mechanism for greatly facilitating a usage of ACD-type systems for an end-user, decreasing frustration level involved with long queue delays and increasing an overall customer satisfaction. As the present embodiments involve direct interaction and feedback to an end-user, the use of the embodiments in a particular product would be easily identifiable.

The present invention advantageously decreases any frustrations experienced by end users who are placed in ACD queues during high traffic times. The present embodiments allow users to gain more control of the users' time by enabling the users to dynamically query the ACD system and evaluate the users' immediate time constraints, whereby the users make respective decisions as to whether it is in their best interest to remain engaged with the ACD system. Additionally, the present embodiments provide ACD vendors with an ability to offer a higher quality of periodic queue notifications to end users, as well as, add to the vendors' business advertising effectiveness by allowing users to navigate media rich and interactive promotional advertising while the end users are held in the queue.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

The invention claimed is:

1. A method for interacting with an automatic call distributor (ACD), the method comprising:
   receiving a call placed from a user to an ACD server, wherein the ACD server comprises a Session Initiation Protocol (SIP) server;
   placing the call into a queue while maintaining a connection between the ACD server and the user for the call;
   sending, by the user at any time while the maintained call is in the queue, a dynamic request to the ACD server to determine at least one of the following queue information selected from the group consisting of a user's queue position, holding times, and other related queue data;
   returning the queue information from the ACD server to the user;
   tracking a hold time for the call, wherein the hold time is an amount of time the call is in the queue; and
   responsive to the user terminating the call, the ACD further:
      responsive to a subsequent call from the user, crediting the subsequent call with the tracked hold time; and
      placing the subsequent call into the queue based on the hold time credited thereto, such that the subsequent call is placed into the queue ahead of calls that have shorter hold times associated therewith and behind calls that have longer hold times associated therewith.

2. The method of claim 1, wherein sending the request utilizes Session Initiation Protocol (SIP).

3. The method of claim 2, further including utilizing a SIP based client for establishing the call with the ACD, the ACD being within a PSTN, and translating SIP messages for the ACD via a PSTN/IP gateway.

4. The method of claim 2, wherein the ACD is a SIP based client, the user is within a PSTN, and a PSTN/IP gateway translates SIP messages for the user.

5. The method of claim 1, further including subsequent to disconnection of at least one call from the user in response to a user directive, calling back the user when the ACD server has determined priority based on a number of times that the user has called and an accumulated wait time.

6. The method of claim 1, further including pushing down content from the ACD server to the user, the content including at least one of the following selected from the group consisting of a web page, media rich promotional advertising, and interactive promotional advertising.

7. The method of claim 1, further including pushing games from the ACD server to the user.

8. The method of claim 1, wherein the user terminates the call before the ACD transfers the call to a live agent.

9. A method for interacting with an automatic call distributor (ACD), the method comprising:
   receiving a call placed from a user to an ACD server, the user call being placed in a queue and maintained while waiting to be connected with a line agent, wherein the ACD server comprises a Session Initiation Protocol (SIP) server;
   dynamically receiving at the ACD server, at any time while the call is in the queue, a request from the user for determining at least one of the following queue information selected from the group consisting of a user's queue position, holding times, and other related queue data, wherein the request utilizes SIP;
   transmitting the queue information from the ACD server to the user;
   tracking a hold time for the call, wherein the hold time is an amount of time the call is in the queue; and
   responsive to the user terminating the call, the ACD further:
      responsive to a subsequent call from the user, crediting the subsequent call with the tracked hold time; and
      placing the subsequent call into the queue based on the hold time credited thereto, such that the subsequent call is placed into the queue ahead of calls that have shorter hold times associated therewith and behind calls that have longer hold times associated therewith.

10. The method of claim 9, wherein the user terminates the call before the ACD transfers the call to a live agent.

11. A system for interacting with an automatic call distributor (ACD) comprising:

means for receiving a call placed from a user to an ACD server, the user call being placed in a queue and maintained while waiting to be connected with a line agent, wherein the ACD server comprises a Session Initiation Protocol (SIP) server;

means for dynamically receiving at the ACD server a request from the user for determining at least one of the following queue information selected from the group consisting of a user's queue position, holding times, and other related queue data, wherein the request utilizes Session Initiation Protocol (SIP) and can be sent by the user at any time while the call is in the queue;

means for transmitting the queue information from the ACD server to the user;

means for tracking a hold time for the call, wherein the hold time is an amount of time the call is in the queue; and means responsive to the user terminating the call for:

responsive to a subsequent call from the user, crediting the subsequent call with the tracked hold time; and placing the subsequent call into the queue based on the hold time credited thereto, such that the subsequent call is placed into the queue ahead of calls that have shorter hold times associated therewith and behind calls that have longer hold times associated therewith.

12. The system of claim 11, wherein the user terminates the call before the ACD transfers the call to a live agent.

13. A computer program product for enabling dynamic queuing in an automatic call distributor (ACD) server comprising:

a computer program processable by a computer system for causing the computer system to:

responsive to receiving a call placed from a user to the ACD server, place the user call in a queue, wherein the ACD server comprises a Session Initiation Protocol (SIP) server, responsive to a user request subsequent to placing the call, dynamically determine at least one of the following queue information selected from the group consisting of a user's queue position, holding times, and other related queue data, transmit the queue information from the ACD server to the user, track a hold time for the call, wherein the hold time is an amount of time the call is in the queue and responsive to the user terminating the call:

responsive to a subsequent call from the user, credit the subsequent call with the tracked hold time; and place the subsequent call into the queue based on the hold time credited thereto, such that the subsequent call is placed into the queue ahead of calls that have shorter hold times associated therewith and behind calls that have longer hold times associated therewith; and apparatus from which the computer program is accessible by the computer system.

14. The computer program product of claim 13, wherein dynamically determining includes receiving the request via Session Initiation Protocol (SIP).

15. The computer program product of claim 14, wherein the computer program is further for causing the computer system to:

subsequent to a disconnection of at least one call from the user in response to a user directive, call back the user when the ACD server has determined a given priority based on a number of times that the user has called and an accumulated wait time.

16. The computer program product of claim 14, wherein a SIP based client is utilized for establishing the call with the ACD server, the ACD server being within a PSTN, wherein the computer program is further for causing the computer system to:

translate SIP messages for the ACD server via a PSTN/IP gateway.

17. The computer program product of claim 14, wherein the ACD server is a SIP based client, and the user is within a PSTN, wherein the computer program is further for causing the computer system to:

translate SIP messages for the user via a PSTN/IP gateway.

18. The computer program product of claim 13, wherein the computer program is further for causing the computer system to:

push down content from the ACD server to the user, the content including at least one of the following selected from the group consisting of a web page, media rich promotional advertising, and interactive promotional advertising.

19. The computer program product of claim 13, wherein the computer program is further for causing the computer system to:

responsive to the user terminating the call before the ACD server transfers the call to a live agent, track how much time the user has been on hold and credit the user an appropriate amount of time the next time the user calls back.

20. The computer program product of claim 13, wherein the computer program is further for causing the computer system to:

push games from the ACD server to the user.

21. The computer program product of claim 13, wherein the user terminates the call before the ACD transfers the call to a live agent.

22. A computer program product for enabling dynamic interacting with an automatic call distributor (ACD) comprising:

a computer program processable by a computer system for causing the computer system to:

receive a call placed from a user to an ACD server, the user call being placed in a queue while waiting to be connected with a line agent, wherein the ACD server comprises a Session Initiation Protocol (SIP) server, dynamically receive at the ACD server a request from the user for determining at least one of the following queue information selected from the group consisting of a user's queue position, holding times, and other related queue data, wherein the request utilizes Session Initiation Protocol (SIP) and can be sent by the user at any time while the call is in the queue, transmit the queue information from the ACD server to the user, track a hold time for the call wherein the hold time is an amount of time the call is in the queue, and responsive to the user terminating the call, cause the ACD server to:

responsive to a subsequent call from the user, credit the subsequent call with the tracked hold time; and place the subsequent call into the queue based on the hold time credited thereto, such that the subsequent call is Placed into the queue ahead of calls that have shorter hold times associated therewith and behind calls that have longer hold times associated therewith; and apparatus from which the computer program is accessible by the computer system.

23. The computer program product of claim 22, wherein the user terminates the call before the ACD transfers the call to a live agent.

* * * * *